United States Patent
Cobble et al.

(10) Patent No.: US 6,882,961 B2
(45) Date of Patent: Apr. 19, 2005

(54) METHOD AND SYSTEM FOR PROVIDING DIAGNOSTICS FOR A WORK MACHINES

(75) Inventors: Tara L. Cobble, Peoria, IL (US); Shannon S. Duvendack, East Peoria, IL (US); Arundhati Karumanchi, Cary, NC (US); Salim Salim, Peoria, IL (US); James E. Wagner, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 472 days.

(21) Appl. No.: 09/742,879

(22) Filed: Dec. 20, 2000

(65) Prior Publication Data

US 2002/0077778 A1 Jun. 20, 2002

(51) Int. Cl.[7] .............................................. G06F 11/30
(52) U.S. Cl. .......................... 702/183; 702/34; 702/35; 702/181; 702/183; 700/17; 700/83; 700/104; 714/26; 706/12; 706/13; 706/45; 706/54; 345/705; 345/708; 345/714
(58) Field of Search ..................... 702/33–36, 113–115, 702/183–185, 188, 181; 700/17, 83, 104; 714/26; 706/12, 13, 45, 912, 46, 47, 54; 345/705, 709, 708, 714, 777

(56) References Cited

U.S. PATENT DOCUMENTS

| | | | | | |
|---|---|---|---|---|---|
| 4,841,441 | A | * | 6/1989 | Nixon et al. ................... | 706/45 |
| 5,005,143 | A | * | 4/1991 | Altschuler et al. ........... | 702/181 |
| 5,107,500 | A | * | 4/1992 | Wakamoto et al. .......... | 706/916 |
| 5,127,005 | A | * | 6/1992 | Oda et al. .................... | 706/916 |
| 5,557,549 | A | * | 9/1996 | Chang .......................... | 345/841 |
| 5,787,234 | A | * | 7/1998 | Molloy ......................... | 706/46 |
| 5,806,060 | A | * | 9/1998 | Borgida et al. ............... | 706/45 |
| 6,125,312 | A | * | 9/2000 | Nguyen et al. .............. | 244/1 R |
| 6,166,736 | A | * | 12/2000 | Hugh .......................... | 345/777 |
| 6,205,472 | B1 | * | 3/2001 | Gilmour ........................ | 707/6 |
| 6,212,528 | B1 | * | 4/2001 | Brophy et al. ................. | 707/1 |
| 6,260,048 | B1 | * | 7/2001 | Carpenter et al. ............ | 706/10 |
| 2002/0007237 | A1 | * | 1/2002 | Phung et al. ................. | 701/33 |
| 2002/0019747 | A1 | * | 2/2002 | Ware et al. .................... | 705/2 |

* cited by examiner

*Primary Examiner*—Marc S. Hoff
*Assistant Examiner*—Elias Desta
(74) *Attorney, Agent, or Firm*—Howard & Howard; W. Bryan McPherson

(57) ABSTRACT

A computer based system and method for providing case base diagnostics for a work machine, is provided. The case bases include diagnostic information and processes related to the work machine. The system and method receive a description of an initial problem from a user and display at least one question, as a function of the initial problem. The system and method also display a first set of recommended actions, as a function of the initial problem, and receive an answer from the user to the at least one question. The system and method further display a second set of recommended actions as a function of the initial problem and the answer to the at least one question, wherein the second set of recommended actions is a subset of the first set of recommended actions.

38 Claims, 15 Drawing Sheets

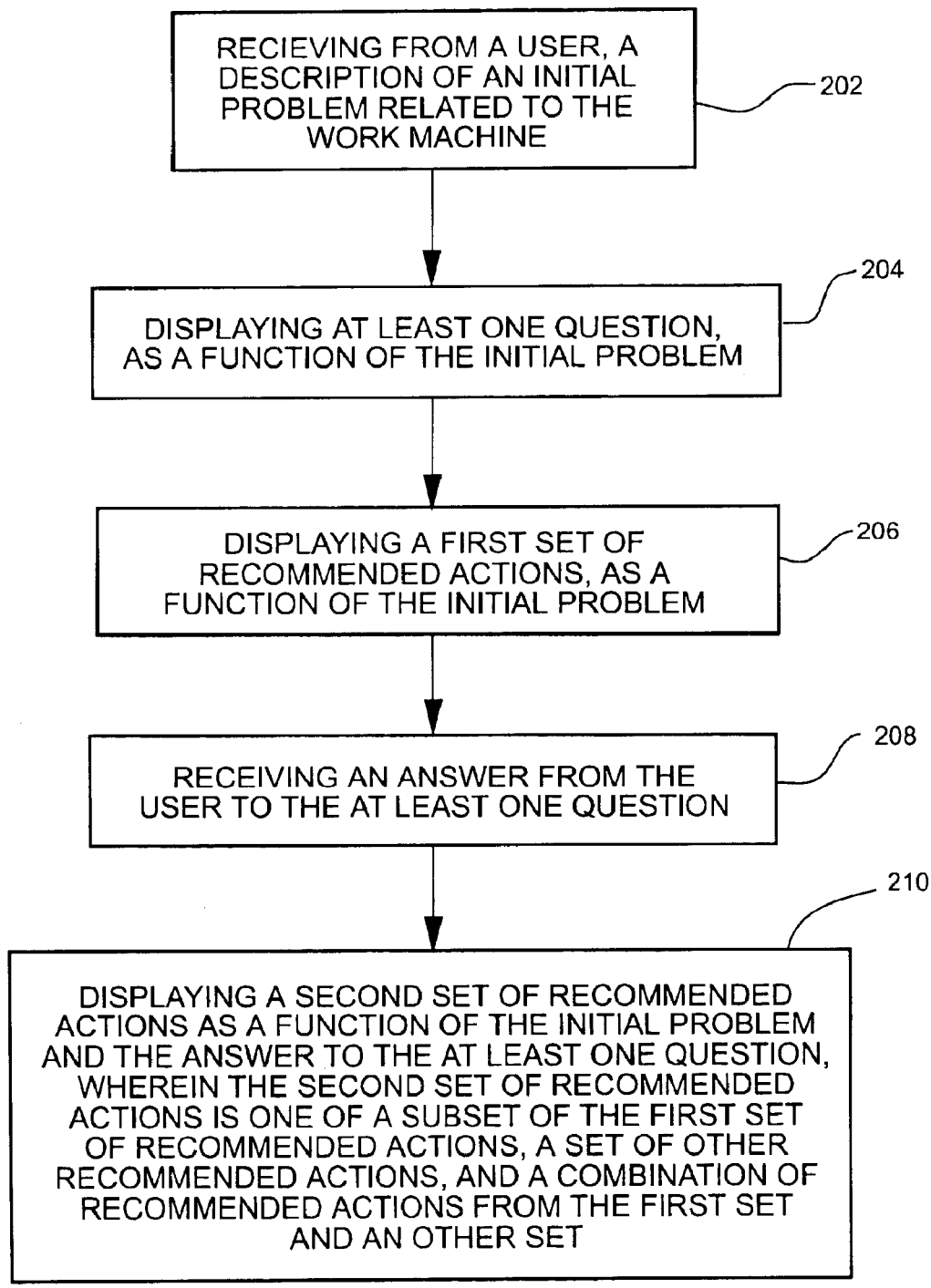

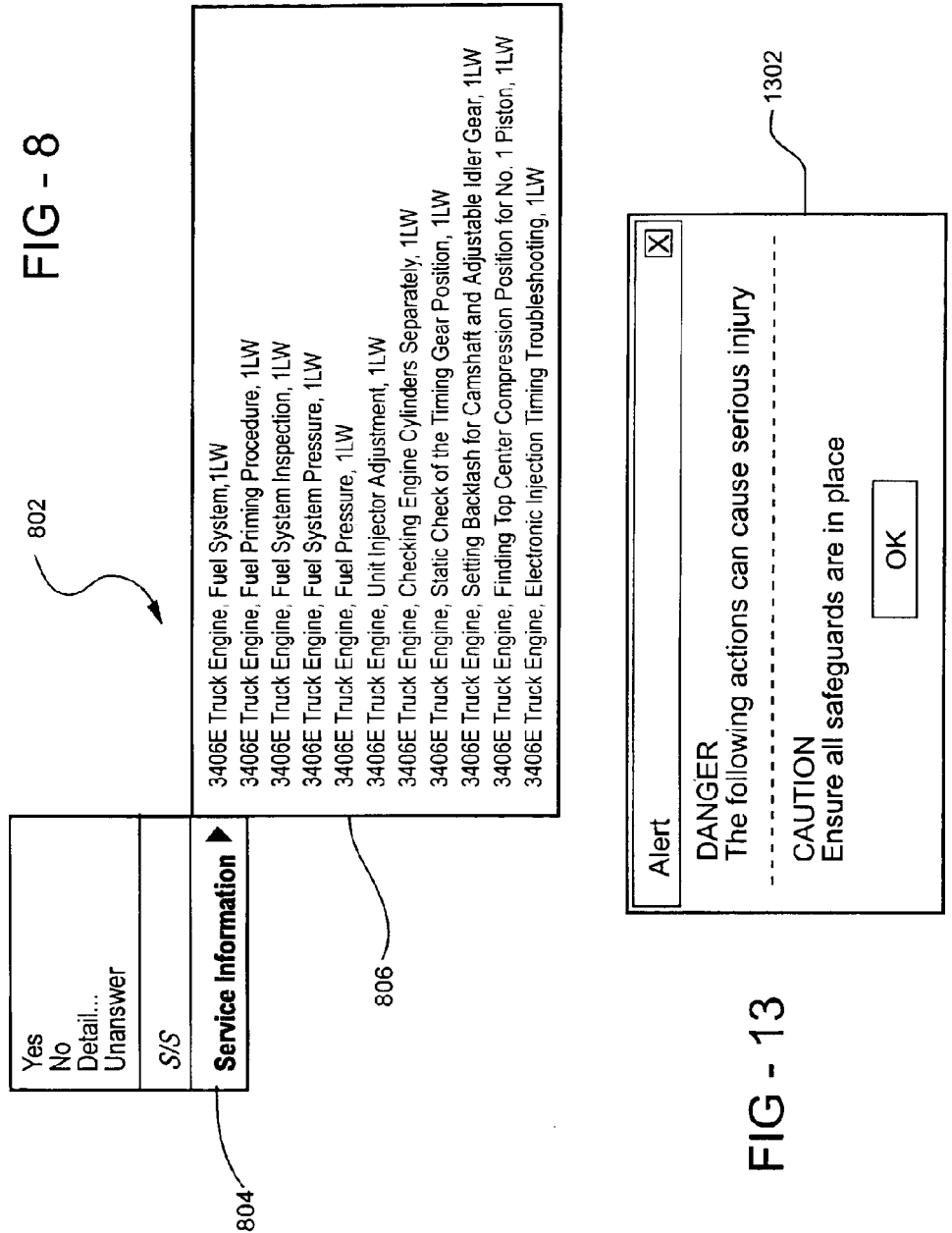

FIG - 18

Feedback Form

Please type in the following information to submit your improvement ideas:

Submitter
Name: _____  Telephone: _____
○ Service Technician   ○ Service Planner   ○ Other- please specify

Did this diagnostic session solve your problem?
○ Yes   ○ No   ○ Provided partial solution

Diagnostics allowed me to quickly and accurately identify and repair the root cause of the problem
○ Strongly Agree   ○ Agree   ○ Neither   ○ Disagree   ○ Strongly Disagree

Next time I have a problem, I will use this system
○ Yes   ○ No   ○ I don't know Initial problem description         Describe the root cause
engine temperature Additional tests performed and results    Describe the repair made Additional feedback / suggestions \* - Required

[ OK ]    [ Cancel ]    [ Clear ]

METHOD AND SYSTEM FOR PROVIDING DIAGNOSTICS FOR A WORK MACHINES

TECHNICAL FIELD

This invention relates generally to providing diagnostics for work machines and work particular to a computer based method and system for providing case based diagnostics for work machines.

BACKGROUND ART

Case based reasoning has been applied to various diagnostics and "help-desk" tools. A case contains a list of symptoms, a set of case bases and a set of action items describing an appropriate repair or test. A case base contains questions and paths to possible repairs/tests, i.e., action items. The case base includes answers to the questions which are designed to lead the user to a diagnosis or an action item to solve the problem.

However, for some work machines or systems there are in existence other tools and systems containing information related to the machine, e.g., repair and technical information. In the field, there may be other systems directly connected to the machine or system that contain information which would be helpful to the diagnostic system to have access to assist in the process of diagnosing or providing repair or test solutions.

The present invention is directed to overcome one or more of the problems as set forth above.

DISCLOSURE OF THE INVENTION

In one aspect of the present invention, a computer based method for providing case base diagnostics for a work machine, is provided. The case bases include diagnostic information and processes related to the work machine. The method includes the steps of receiving from an user, a description of an initial problem related to the work machine and displaying at least one question, as a function of the initial problem. The method also includes the steps of displaying a first set of recommended actions, as a function of the initial problem, and receiving an answer from the user to the at least one question. The method further includes the step of displaying a second set of recommended actions as a function of the initial problem and the answer to the at least one question, wherein the second set of recommended actions is a subset of the first set of recommended actions.

In another aspect of the present invention, a computer based system for providing case base diagnostics for a work machine is provided. The case bases include diagnostic information and processes related to the work machine. The system includes an external source containing service information related to the work machine and a diagnostic advisor tool. The diagnostic advisor tool is adapted to interact with a user, receive information from the user and responsively display at least one recommended action, and provide a link to relevant information within the external source.

BRIEF DESCRIPTION OF THE DRAWINGS

FIG. 2 is a flow diagram of a method for providing case base diagnostics for a work machine, according to an embodiment of the present invention;

FIG. 8 is a diagrammatic illustration of a Pop-Up Menu of the computer based system and method of FIGS. 1 and 2;

FIG. 13 is a diagrammatic illustration of an Alert Dialog;

FIG. 18 is a diagrammatic illustration of a Create New Report Dialog of the computer based system and method of FIGS. 1 and 2;

FIG. 19 is a diagrammatic illustration of a Feedback Dialog of the computer based system and method of FIGS. 1 and 2.

BEST MODE FOR CARRYING OUT THE INVENTION

With reference to the drawings and in operation, the present invention provides a computer based method and system and a computer program for providing case based diagnostics for a work machine. The work machine can be any sort of machine such as an earthmoving machine, construction machine, transportation machine, engine, computer, air conditioner, etc. . . . This list is exemplary only and not intended to be exclusive.

Generally, a case contains diagnostic information and processes related to a work machine. A case contains a list of symptoms, a set of case bases, and a set of action items describing an appropriate repair or test. A case base contains questions and paths to possible repairs/tests.

Preferably, the present invention is implemented in software for execution on a computer.

Figure 1:
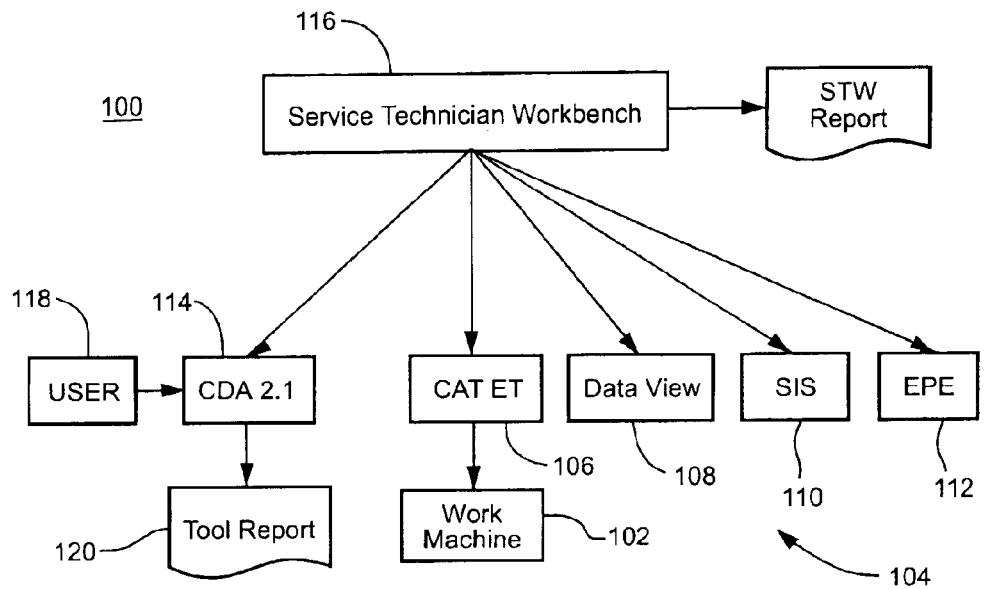
FIG. 1 is a block diagram of a computer based system for providing case base diagnostics for a work machine, according to an embodiment of the present invention.

With reference to FIG. 1, a computer based system 100 for providing case based diagnostic for a work machine 102 according to the present invention will now be discussed.

An external source 104 provides service information related to the work machine 102. Preferably, the external source 104 includes an Electronic Technician (ET) module 106, a Data View module 108, a service information system 110, and an (EPE). The service information system 110 includes service information related to the work machine 102. Preferably, the service information system 112 includes system functional tests and diagnostic code procedures.

The computer based system 100 includes a diagnostic advisor tool 114. The computer based system 100 further includes a tool report module 116 for generating reports.

In the preferred embodiment, the diagnostic advisor tool 114 is linked to the external source 104 through a common software module called Service Technician Workbook (STW) 116.

The computer based system 100 is utilized by an user 118. The user 118 utilizes the diagnostic advisor tool 114 to provide diagnostics to the work machine 102. As discussed below, links to sources of information within the external source 104 are provided within the diagnostic advisor tool 114. The linked information may includes technical information, system functional tests and/or diagnostic code procedures. A system functional test is defined as a procedure for troubleshooting systems, circuits or specific components of the work machine 102. Most of these tests are developed to determine if the system, circuit or component is functioning correctly, and if not, to isolate the cause of the problem. A diagnostic code procedure is defined as a trouble shooting procedure for determining the cause of a diagnostic code returned by an electronic control module (ECM) over a data link identifying past or present logged problems with the ECM (not shown).

Electronic Technician or ET links may also be embedded into question and actions. ET links will be attached to questions to aid the user 118 in answering the questions. For instance, the question may read "What is the oil temperature?". The user 118 could then click on the ET attachment that will automatically read the oil temperature from the machine. Comparatively, an action may state "Check for any logged or active codes on the machine."

The computer based system 100 is embodied in computer program product i.e., software. The computer program product comprises a computer usable storage medium having computer readable program code means embodied in the medium.

With reference to FIG. 2, a computer based method 200 for providing case base diagnostics for a work machine 102, is provided. The case bases are comprised of diagnostic information and processes related to the work machine 102. In a first step 202, a description of an initial problem related to the work machine 102 is received from the user 118. In a second step 204 at least one question is displayed as a function of the first question. In a third step 206, a first set of recommended actions is displayed as a function of the initial problem. An answer to the at least one question is provided by the user 118 in a fourth step 208. A second set of recommended actions is displayed as a function of the initial problem and the answer provided by the user 118 in a fifth step. The second set of recommended actions is a subset of the first set of recommended actions.

With reference to FIGS. 3–17, the present invention provides a graphical user interface 300 for use by the user 118 to interface with the system 100.

Figure 3:
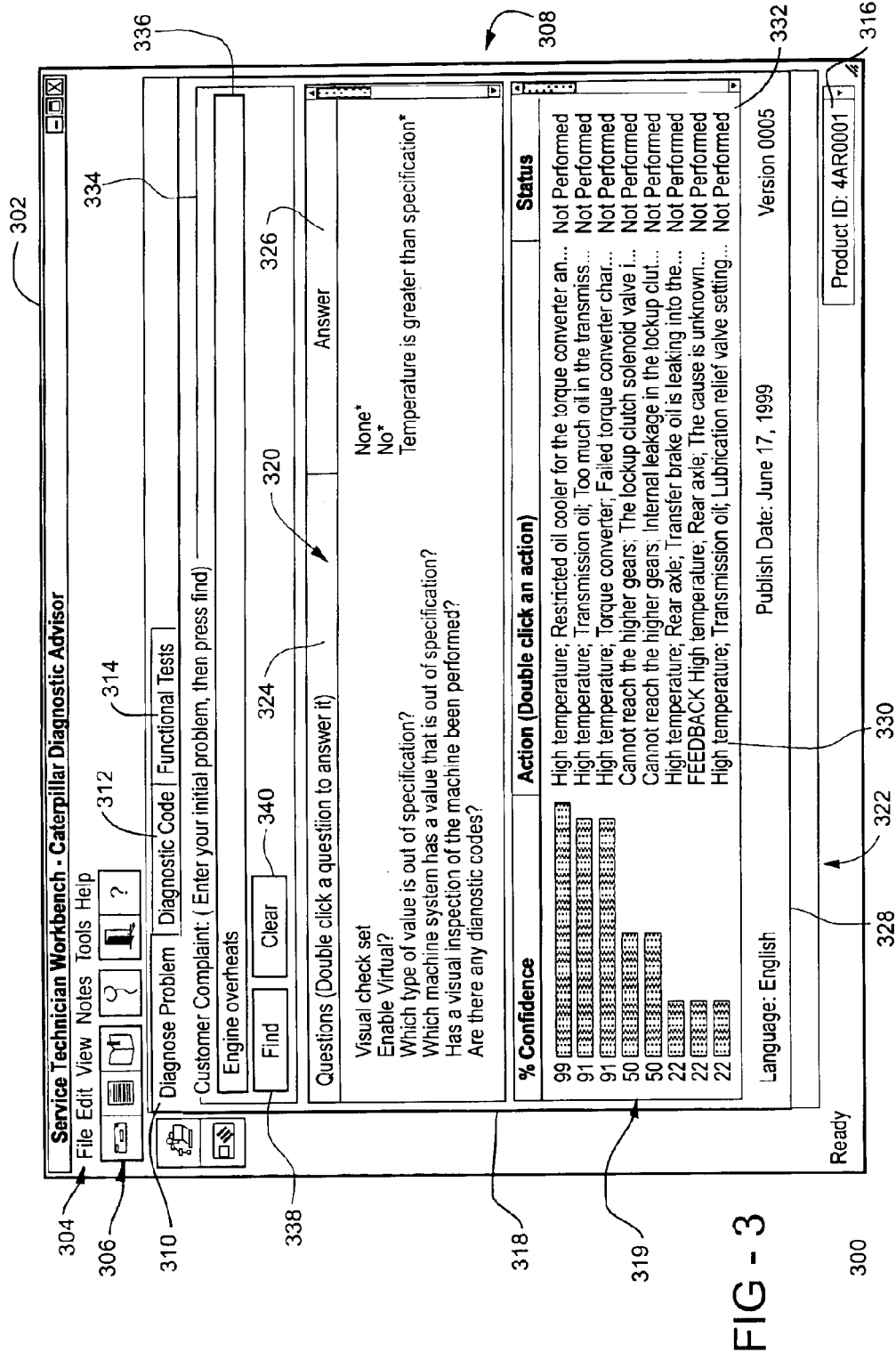
FIG. 3 is a diagrammatic illustration of a Diagnostic Advisor Window of the computer based system and method of FIGS. 1 and 2.

With particular reference to FIG. 3, the graphical user interface 300 includes a Diagnostic Advisor Window 302. The Diagnostic Advisor Window 302 includes a Menu Bar 304, a Toolbar 306, and a Tabbed Panel 308. The graphical user interface 300 further includes a Diagnose Problem Tab 310, a Diagnostic Code Tab 312, a Functional Tests Tab 314, and a Product ID Drop Down List 316.

The Tabbed Panel 306 includes an Information Panel 318. The contents of the Information Panel 318 are dependent upon an active or selected Tab 310, 312, 314.

Figure 4:
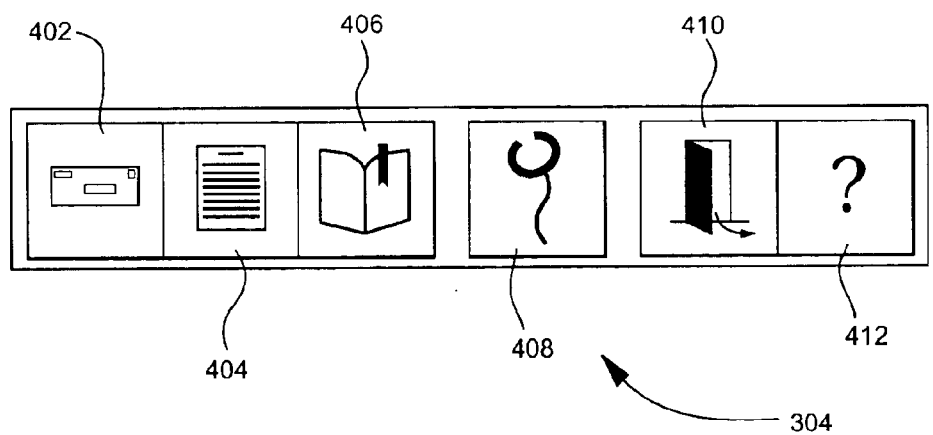
FIG. 4 is a diagrammatic illustration of a button bar of the computer based system and method of FIGS. 1 and 2.

With reference to FIG. 4, the tool bar 304 preferably includes a Feedback Button 402, a Report Button 404, a Bookmark Button 406, a Read Codes Button 408, an exit button 410 and a Help Button 412.

Returning to FIG. 3, when the Diagnostic Problem Tab 310 is selected or actuated, the Information Panel 318 includes a Diagnostic Panel 319. The Diagnostics Panel 319 includes a Questions Section 320 and a Recommended Action Section 322. The Questions Section 320 includes a Question Column 324 and an Answer Column 326. As shown, a series of questions is listed in the Questions Section 320. A corresponding entry (to each question) in the Answer Column 326 lists the answers to the respective question.

The Recommended Action Section 322 includes a Confidence Column 328, an Action Column 330, and a Status Column 332.

The Diagnostic Panel 319 further includes a Complaint Section 334. The Complaint Section 334 includes a Customer Complaint Text Field 336, a Find Button 338 and a Clear Button 340. The Clear Button 340 clears the Customer Complaint Text Field 336.

In order to begin the diagnostic process, the user 118 enters the initial problem into the Customer Complaint Text Field 336 and actuates the Find Button 338. A list of relevant questions are displayed in the Question Column 324 of the Question Section 320. The answers given by the user 118 or default answers are displayed in the answers column 326.

A list of possible actions to resolve the complaint are listed in the Action Column 330 of the Action Section 322. The status of the relevant action, e.g., performed or not performed are listed in the Status Column 332.

As explained below, the user 118 answers one or more of the questions presented. As the questions are answered, the Action Section 322 is updated, e.g., actions no longer valid are removed. Additionally, the confidence levels are updated. Preferably, the Confidence Column 328 includes at least one confidence gauge illustrating the relative confidence of the action.

In the preferred embodiment, the user 118 answers questions by invoking a pop-menu related to the question to be answered. Typically, pop-up menus are invoked by clicking on the desired question with the right mouse button of a two button mouse. The contents of the pop-menu will be dependent upon the desired question.

Some exemplary pop-up menus are shown in FIGS. 5–8.

Figure 5:
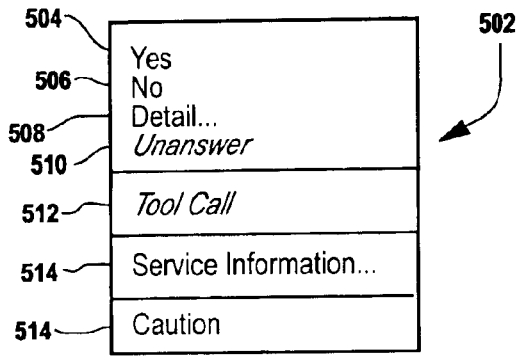
FIG. 5 is a diagrammatic illustration of a Pop-up Menu of the computer based system and method of FIGS. 1 and 2.

With specific reference to FIG. 5, a pop-up menu 502 with several choices is illustrated. Unavailable choices are "grayed" out. In this instance, the proper answer to the question is a simple "Yes" 504 or "No" 506. To answer the question, the user 118 simply selects the proper answer. The Pop-Up Menu 502 disappears and the selected answer is input to the system 100.

The Pop-up Menu 502 provides additional options as well. For example, the user 118 can get detailed information related to a question (option 508). If a previous answer was erroneous or has changed, the user 118 can "unanswer" the question (option 510). Additionally, the user 118 can choose to run the Service Information System 110 (option 512) or to view linked service information 514. The Pop-up Menu 502 may also include a link to alert, warning, or caution information 514.

Figure 6:
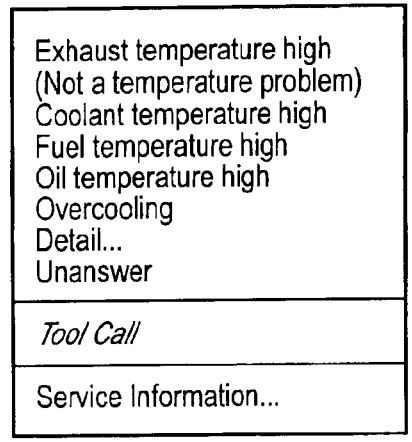
FIG. 6 is a diagrammatic illustration of a Pop-Up Menu of the computer based system and method of FIGS. 1 and 2.

With reference to FIG. 6, if the question requires more than a yes or no answer, the Pop-up Menu 602 includes all of the possible answers to the question.

Figure 7:
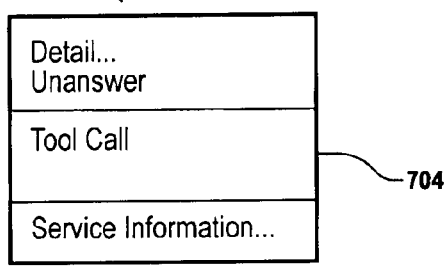
FIG. 7 is a diagrammatic illustration of a Pop-Up Menu of the computer based system and method of FIGS. 1 and 2.

With reference to FIG. 7, a link to the Electronic Technician Module 704 on a Pop-Up Menu 702 may also be provided.

With reference to FIG. 8, if the user 118 wants to see service information related to the relevant question, the user 118 highlights the Service Information Option 804 on the Pop-Up Menu 802. A list 806 of the available service information documents appears. The User 118 can select the desired documents from the list 806.

Figure 9:
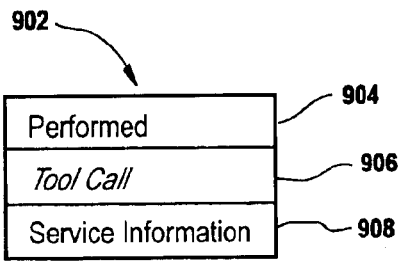
FIG. 9 is a diagrammatic illustration of an Action Pop-Up Menu of the computer based system and method of FIGS. 1 and 2.

With reference to FIG. 9, the user 118 indicates that a recommended action has been performed through a Performed Option 904 on an Action Pop-Up Menu 902. The Action Pop-Up Menu 902 may also include links to external sources, e.g., a Service Information System link 906 or a link to available service information documents 908.

Figure 10A:
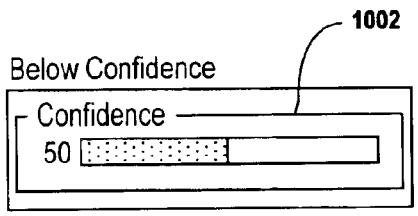
FIG. 10A is a diagrammatic illustration of a Confidence Bar of the computer based system and method of FIGS. 1 and 2.
Figure 10B:
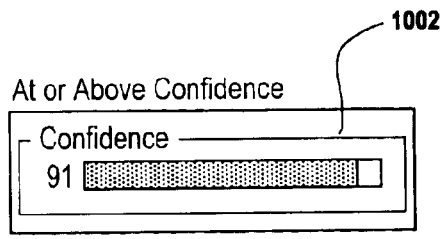
FIG. 10B is a second diagrammatic illustration of the Confidence Bar of FIG. 10A.

With reference to FIGS. 10A and 10B, a confidence bar 1002 is used to give the user 118 a visual cue as to how likely an action is to correct a problem. The confidence bar 1002 is displayed in the Confidence Column 328 in the same line as the relevant action. Preferably, the confidence bar is in the form of a bar graph. Additionally, the bar graph is in a first color, such as black, if the stated confidence is below a predetermined level and a second color, such as green, if the stated confidence is above a predetermined level.

Figure 11:
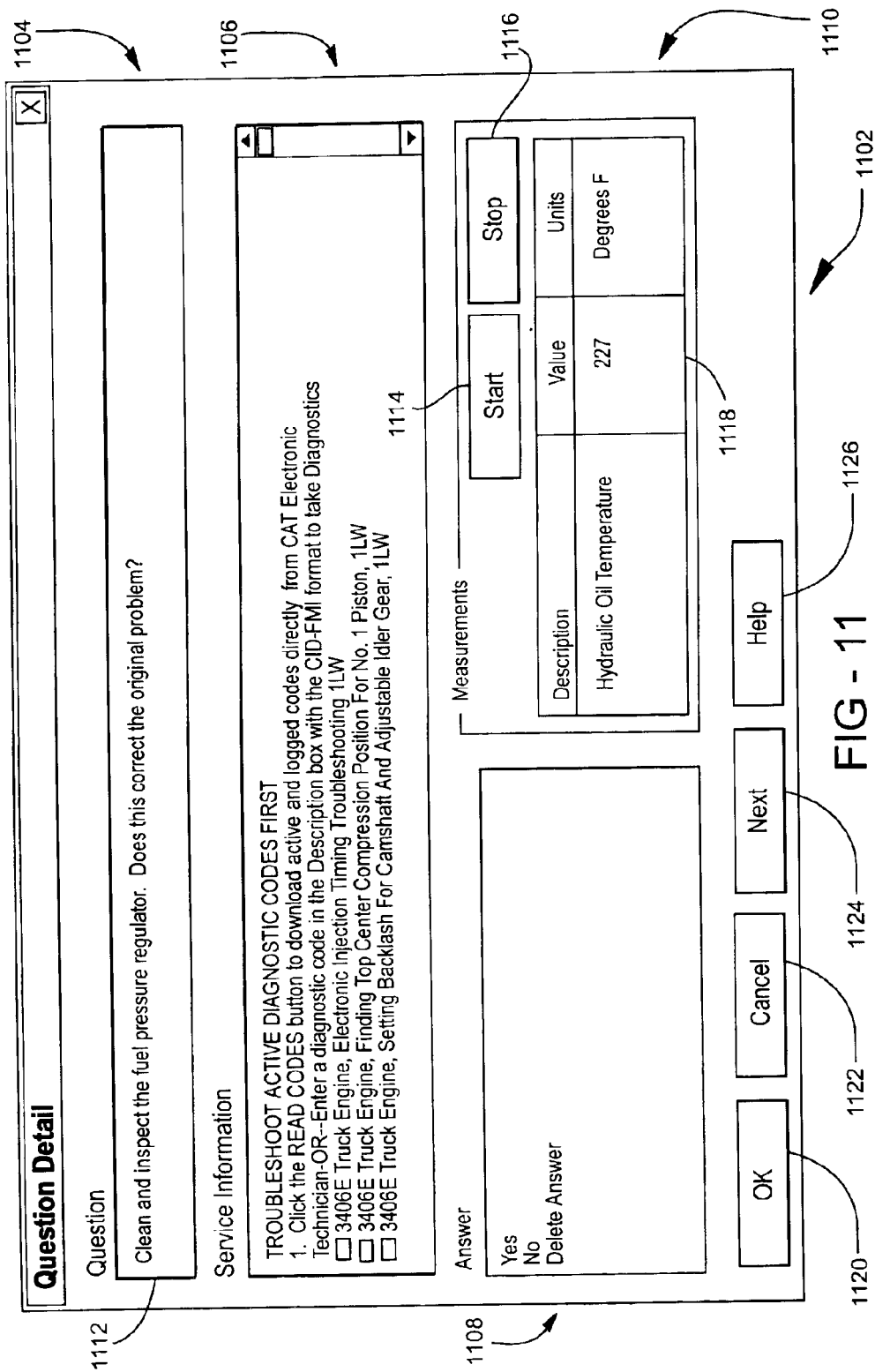
FIG. 11 is a diagrammatic illustration of a Question Detail Window of the computer based system and method of FIGS. 1 and 2.

With reference to FIG. 11, if the user 118 selects the Detail Option 508 from the Pop-Up Menu 502, a Question Detail Window 1102 is displayed. The Question Detail Window 1102 includes a Question Section 1104, a Service Information Section 1106, an Answer Section 1108, and a Measurement Section 1110.

The Question Section 1104 includes a Question Text Field 1112 which contains the question to be answered by the user 118. The Service Information Section 1106 includes links to specified service information documents. These links are preferably hyperlinks. Actuation of the hyperlinks opens the relevant document. The Answer Section 1108 lists all available answers to the question. The user 118 simply selects the appropriate answer.

The Measurement Section 1110 includes a Start Button 1114, a Stop Button 1116, and a List 1118. The Measurement Section 1110 provides a link to data available from the work machine 102 via the Electronic Technician Module 106 through the Service Technician Workbench 116. A list of all available measurement sources from the work machine 102 is shown in the List 1118. The user 118 selects the desired measurement and actuates the Start Button 1114 to retrieve the data.

The Question Detail Window 1102 includes an OK Button 1120, a Cancel Button 1122, a Next Button 1124 and a Help Button 1126. Actuation of the OK Button 1120 dismisses the Question Detail Window 1102 while saving any information stored in the Question Detail Window 1102.

Actuation of the Cancel Button 1122, dismisses the Question Detail Window 1102 without saving any data.

Actuation of the Next Button 1124 brings up the next question, if any, into the Question Detail Window 1102.

Figure 12A:
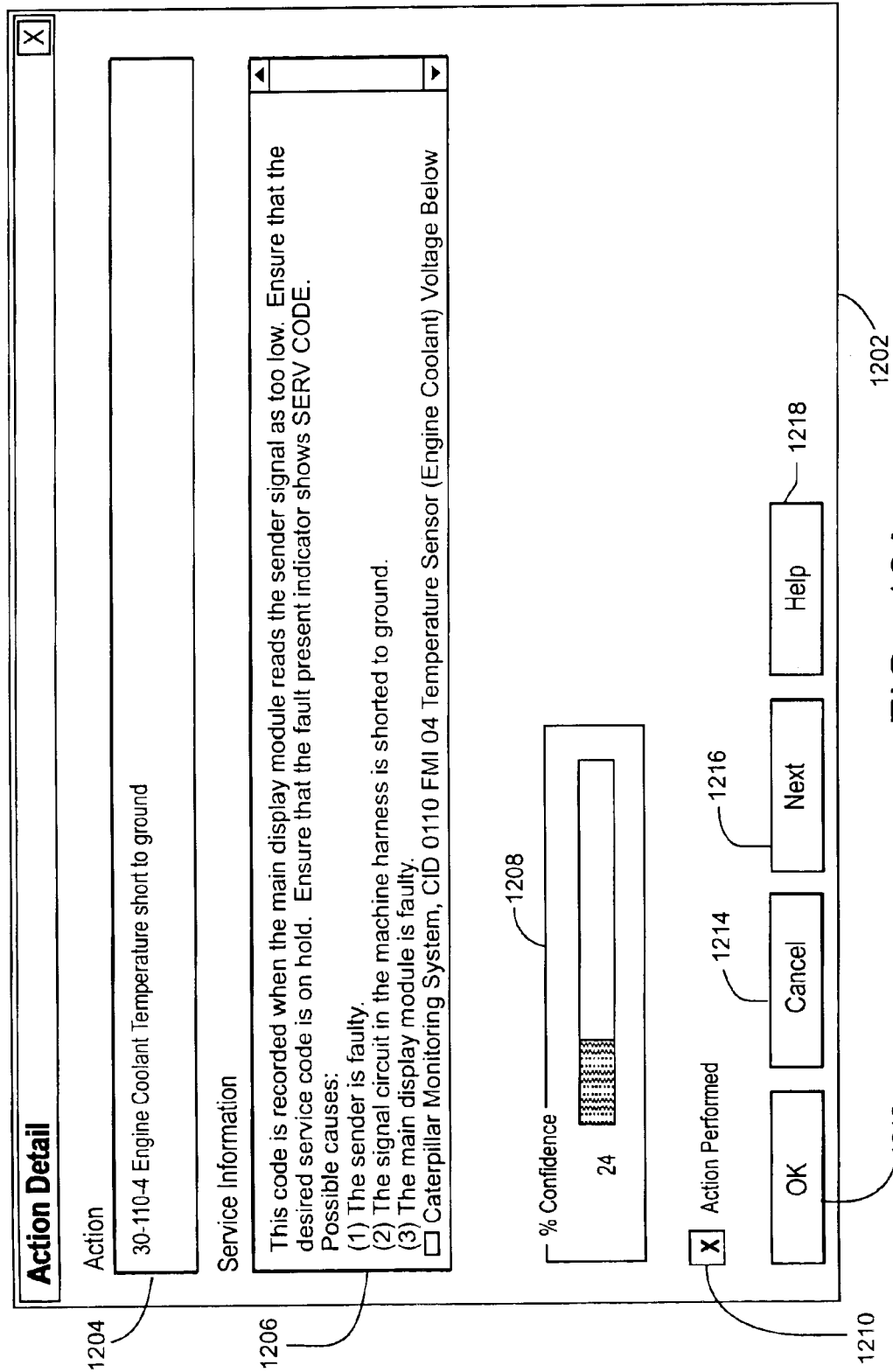
FIG. 12A is a diagrammatic illustration of an Action Detail Window of the computer based system and method of FIGS. 1 and 2.
Figure 12B:
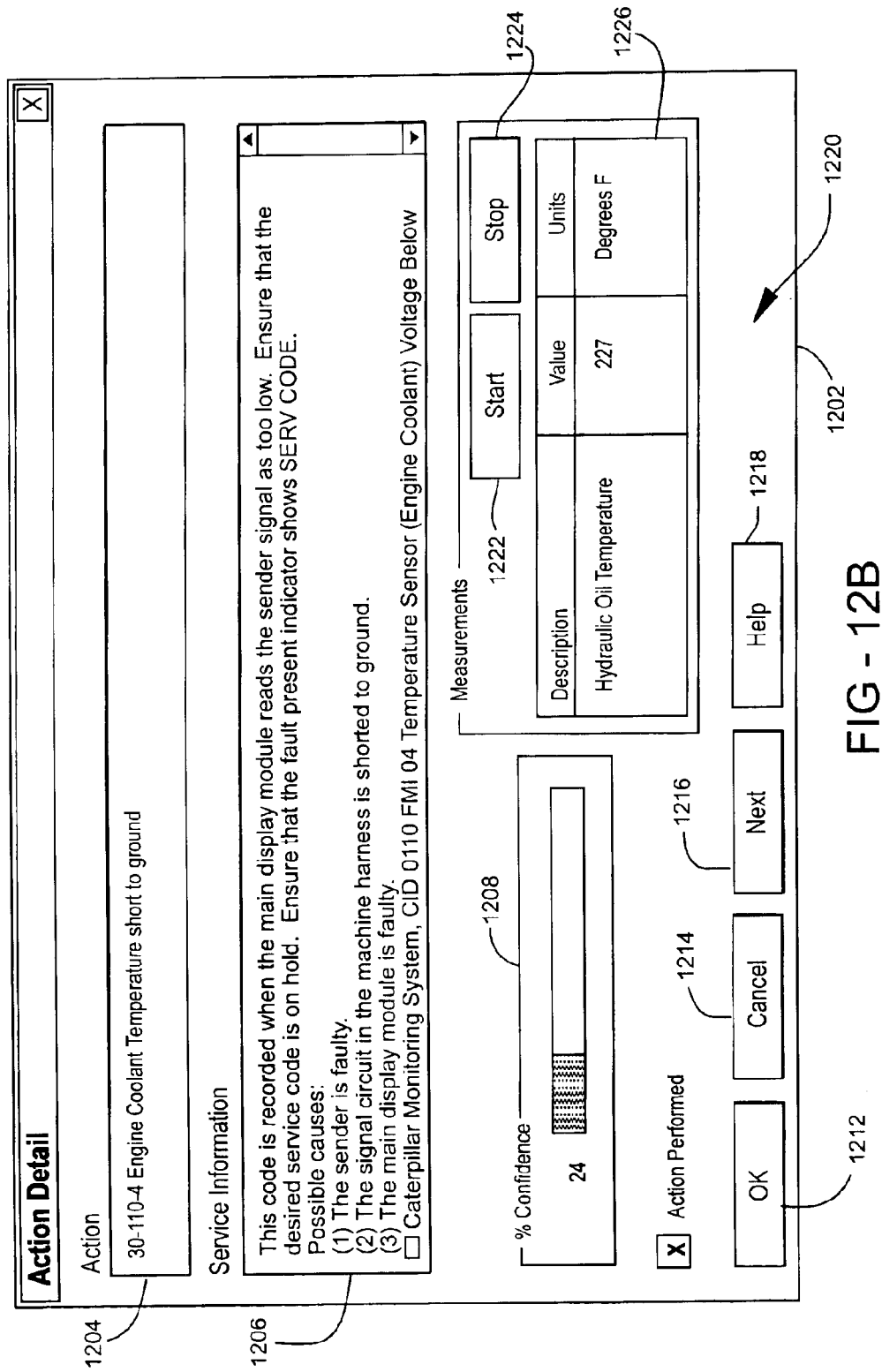
FIG. 12B is a second diagrammatic illustration of the Action Detail Window of FIG. 12A.

With reference to FIGS. 12A and 12B, the user 118 can double click on an Action to display an Action Detail Window 1202. The Action Detail Window 1202 includes an Action Text Box 1204, a Service Information Text Box 1206, a Confidence Gauge 1208, and an Action Performed Check Box 1210.

The Action Text Box 1204 includes a description of the recommended action.

The Service Information Text Box 1206 includes detailed information regarding the recommended action item, as well as links to external sources for additional information.

The Confidence Gauge 1208 gives the user 118 a visual indication of the likelihood that the current recommended action will solve the problem.

The user 118 actuates the Action Performed Check Box 1208 to indicate that the present action has been performed.

The Action Detail Screen 1202 further includes an OK Button 1212, a Cancel Button 1214, a Next Button 1216, and a Help Button 1218. Actuation of the OK Button 1212 dismisses the Action Detail Window 1102 while saving any information stored in the Action Detail Window 1102.

Actuation of the Cancel Button 1214, dismisses the Question Detail Window 1102 without saving any data.

Actuation of the Next Button 1216 brings up the next recommended action, if any, into the Answer Detail Window 1202.

With reference to FIG. 12B, an Action Detail Screen 1202 is shown including an Measurements Section 1220. The Measurement Section 1220 includes a Start Button 1222, a Stop Button 1224, and a List 1226. The Measurement Section 1220 provides a link to data available from the work machine 102 via the Electronic Technician Module 106 through the Service Technician Workbench 116. A list of all available measurement sources from the work machine 102 is shown in the List 1226. The user 118 selects the desired measurement and actuates the Start Button 1114 to retrieve the data.

With reference to FIG. 13, an Alert Dialog 1302 is displayed prior to the display of the Question Detail Window 1102 or the Action Detail Window 1202. The Alert Dialog 1302 includes an OK Button 1304 which must be actuated to dismiss of the Alert Dialog 1302.

Preferably, the Diagnostic Advisor Tool 114 has four levels of alerts: Dangers; Warnings; Cautions; and Notices.

Figure 14:
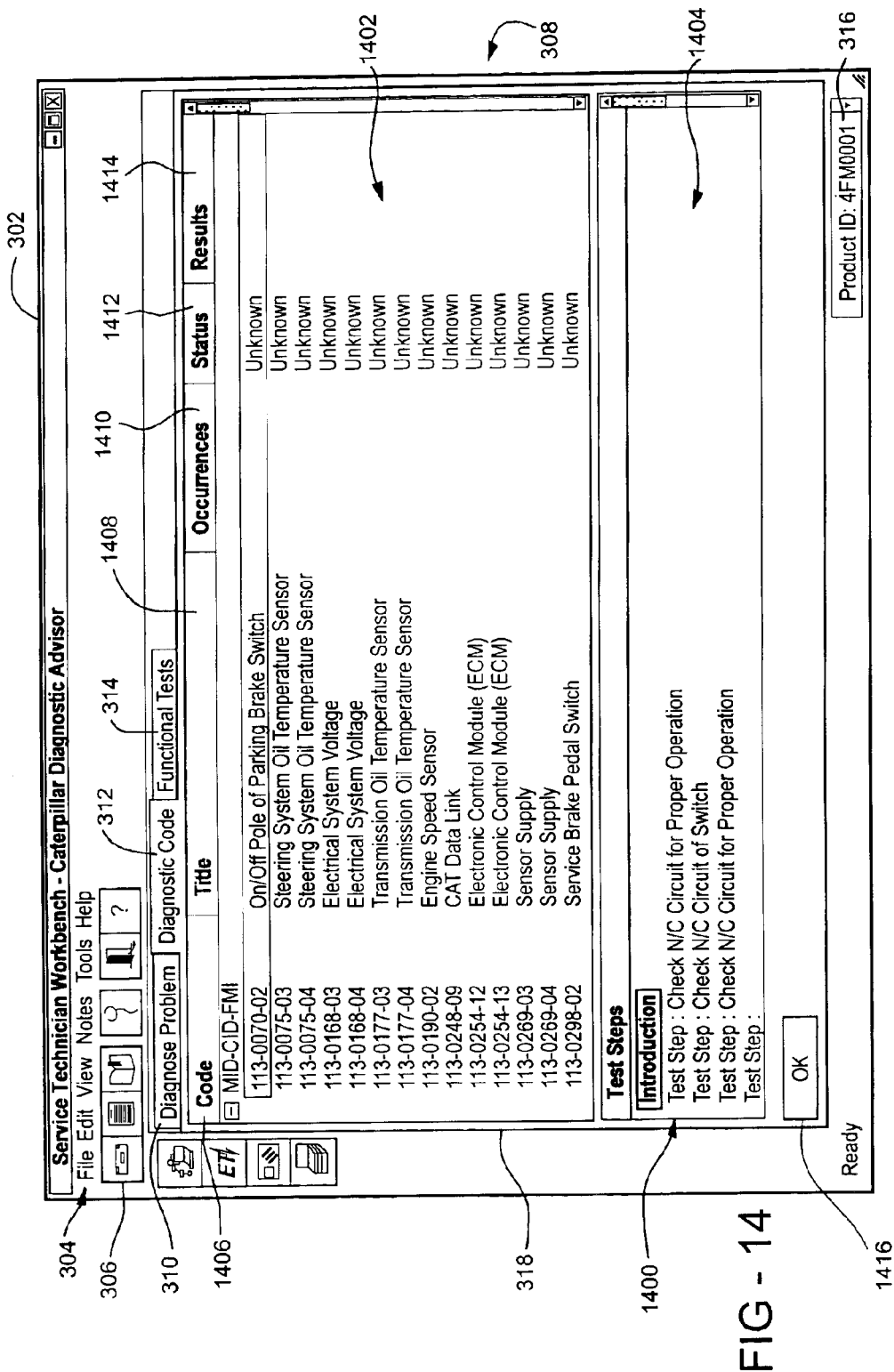
FIG. 14 is a diagrammatic illustration of a Diagnostics Code Procedures List and Test Steps List of the computer based system and method of FIGS. 1 and 2.

With reference to FIG. 14, when the Diagnostic Code Tab 312 is selected or actuated, the Information Panel 318 includes a Diagnostic Code Panel 1400. The Diagnostic Code Panel 1400 includes a Diagnostic Code Procedures List 1402 and a Test Steps List 1404.

The Diagnostic Code Procedures List 1402 displays all valid codes and test names for the current serial number/prefix selected in the Product ID Drop Down List 316. Preferably, the Diagnostic Code Procedures List 1402 includes a Code Column 1406, a Title Column 1408, a Occurrences Column 1410, a Status Column 1412, and a Results Column 1414. The Code Column 1406 and the Title Column 1408 contain identifying information. The Occurrences Column 1410 and the Status Column 1412 lists the number of occurrences for the respective code and the current status, respectively. In the preferred embodiment, this information is received from the Electronic Technician Module 106.

As shown, the diagnostic codes displayed in the Diagnostic Code Procedures List 1402 are grouped in an expandable tree format. An OK Button 1416 starts the selected test step.

The Test Steps List 1404 displays the tests steps for the currently selected code in the Diagnostic Code Procedures List 1402. After the test is over, the result is displayed on the Results Column 1414.

Figure 15:
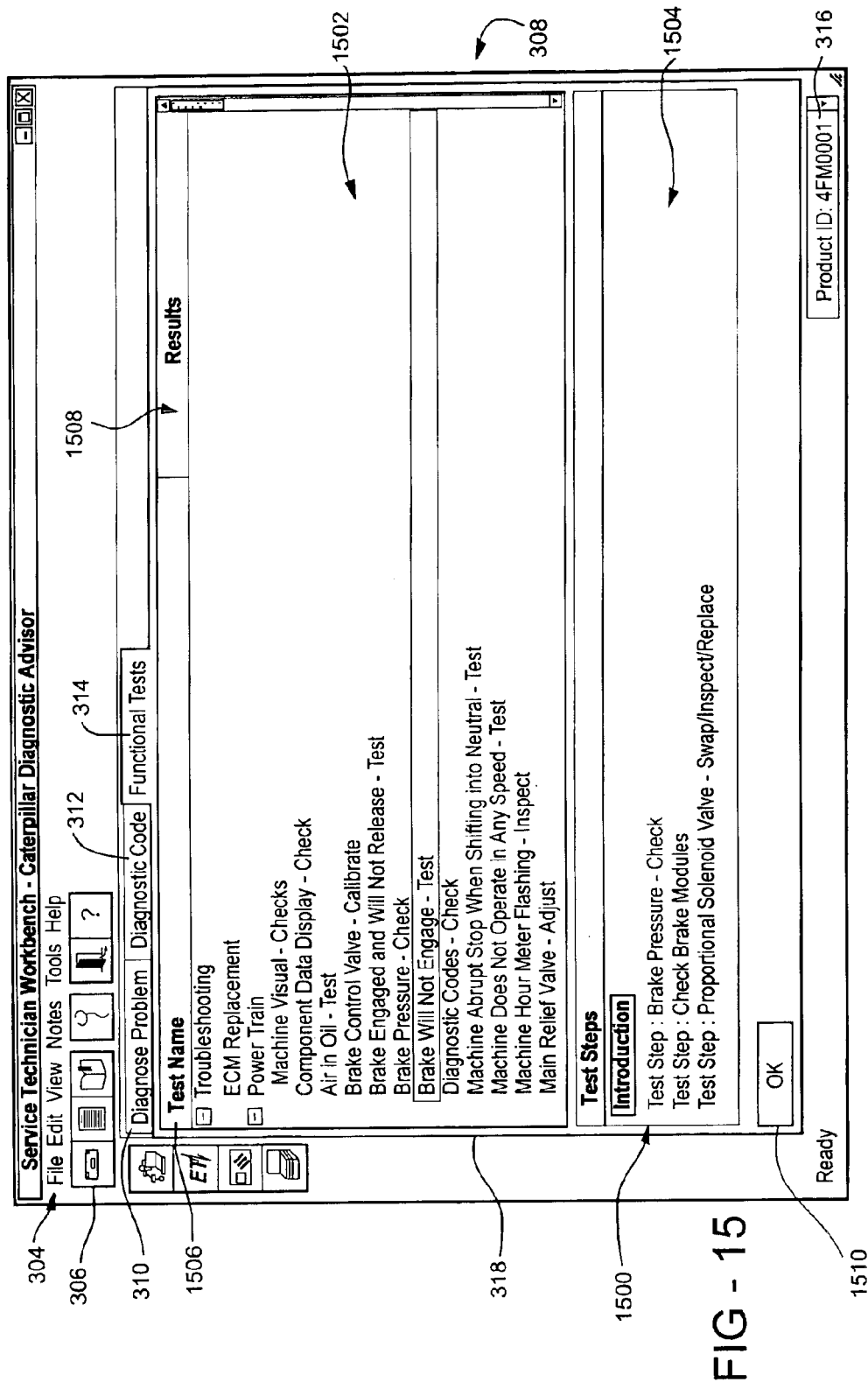
FIG. 15 is a diagrammatic illustration of a Functional Test List and a Functional Test Steps List of the computer based system and method of FIGS. 1 and 2.

With reference to FIG. 15, when the Functional Tests Tab 314 is selected or actuated, the Diagnostic Panel 318 includes a Functional Test Panel 1500. The Functional Test 1500 Panel includes a Functional Test List 1502 and a Functional Test Steps List 1504.

The Functional Test List 1502 includes a Test Name Column 1506 and a Results Column 1508. The Test Name Column 1506 includes a list of all functional tests available for the current serial number/prefix selected in the Product ID Drop Down List 316. Preferably, the functional tests are grouped in an expandable tree format as shown.

The test steps for the currently selected functional test in the Functional Test List 1502 are displayed in the Functional Test Steps List 1504. An OK Button 1510 starts the selected step in the Function Test Steps List 1504.

Figure 16:
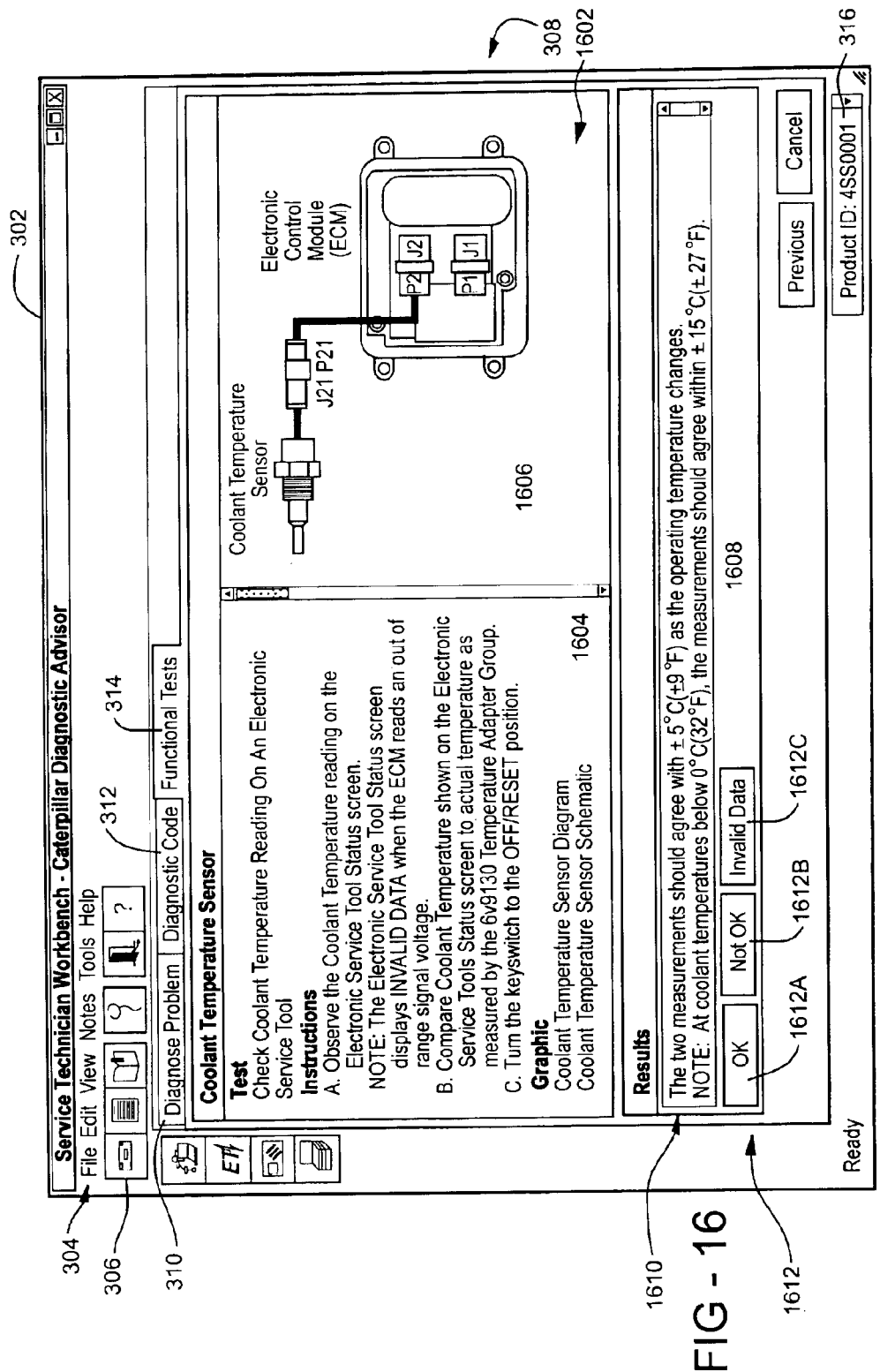
FIG. 16 is a diagrammatic illustration of a Test Procedure Panel of the computer based system and method of FIGS. 1 and 2.

With reference to FIG. 16, when either OK Button 1416, 1510 is actuated the Diagnostic Panel 318 includes a Test Procedure Panel 1602. FIG. 16 shows an exemplary step in a functional test, however, the Test Procedure Panel 1602 for a diagnostic step operates in a similar manner. The Test Procedure Panel 1602 includes a Test Step Panel 1604, a Graphic Viewer Panel 1606 and a Results Panel 1608. The Test Step Panel 1604 displays detailed test step information. The following may be included in the Test Step Panel 1604:

Title

Instructions

Links to Service Information System 110

Links to graphics associated with the test

Links to alerts (danger/warnings/caution/notice)

Links to a detail section associated with the test.

Graphics, alerts and detailed information are displayed in the Graphics Viewer Panel 1606.

The Results Panel 1608 includes an optional Results Text Field 1610 and a series of Results Buttons 1612. The Results Text Field 1610 includes a description of the results. The Results Buttons 1612 are used by the user 118 to select the appropriate results from the test step. The number and description of each button 1612 is dependent upon the test step and the possible results from the test step. For example as shown in FIG. 16, the coolant temperature sensor function test step has an OK Button 1612A, a NOT OK Button 1612B, and an INVALID DATA Button 1612C.

A Previous Button 1614 returns to a previous step (if any) and a Cancel Button 1616 dismisses the Test Procedure Panel 1602.

Figure 17:
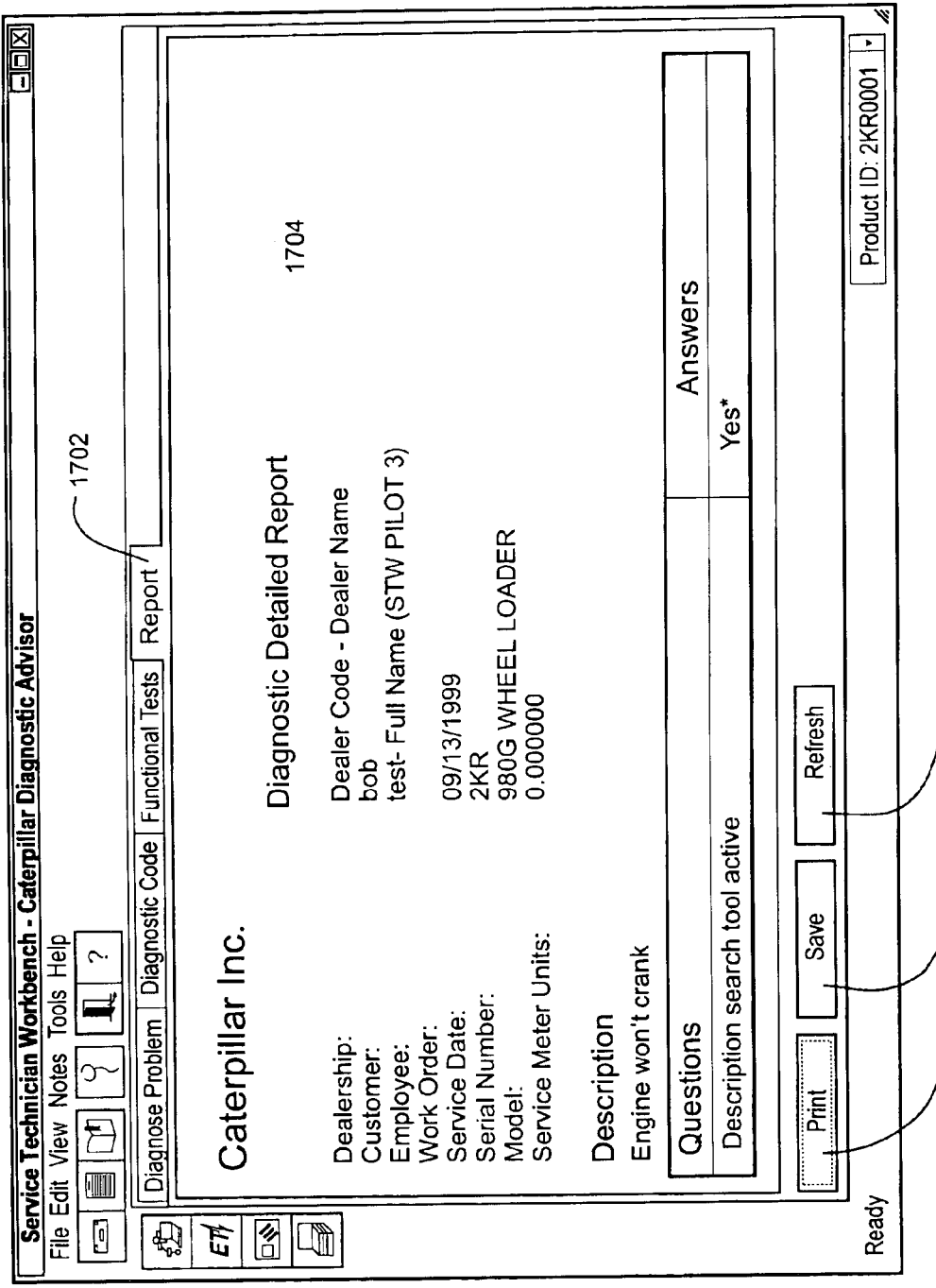
FIG. 17 is a diagrammatic illustration of a Report Panel of the computer based system and method of FIGS. 1 and 2.

With reference to FIG. 17, the Tabbed Panel 308 also includes a Report Tab 1702. Selection of the Report Tab 1702 by the user 118, results in a Report Panel 1704 being displayed. The Report Panel 1704 includes detailed information about the current diagnostic session. The Report Panel 1704 includes a Print Button 1706, a Save Button 1708, and a Refresh Button 1710. Actuation of the Print Button 1706 opens up a Print Dialog (not shown) for printing the current report. Actuation of the Save Button 1708 opens a Save Dialog (not shown) for saving the report. And actuation of the Refresh Button 1810 refreshes the report with any new data.

Figure 18:
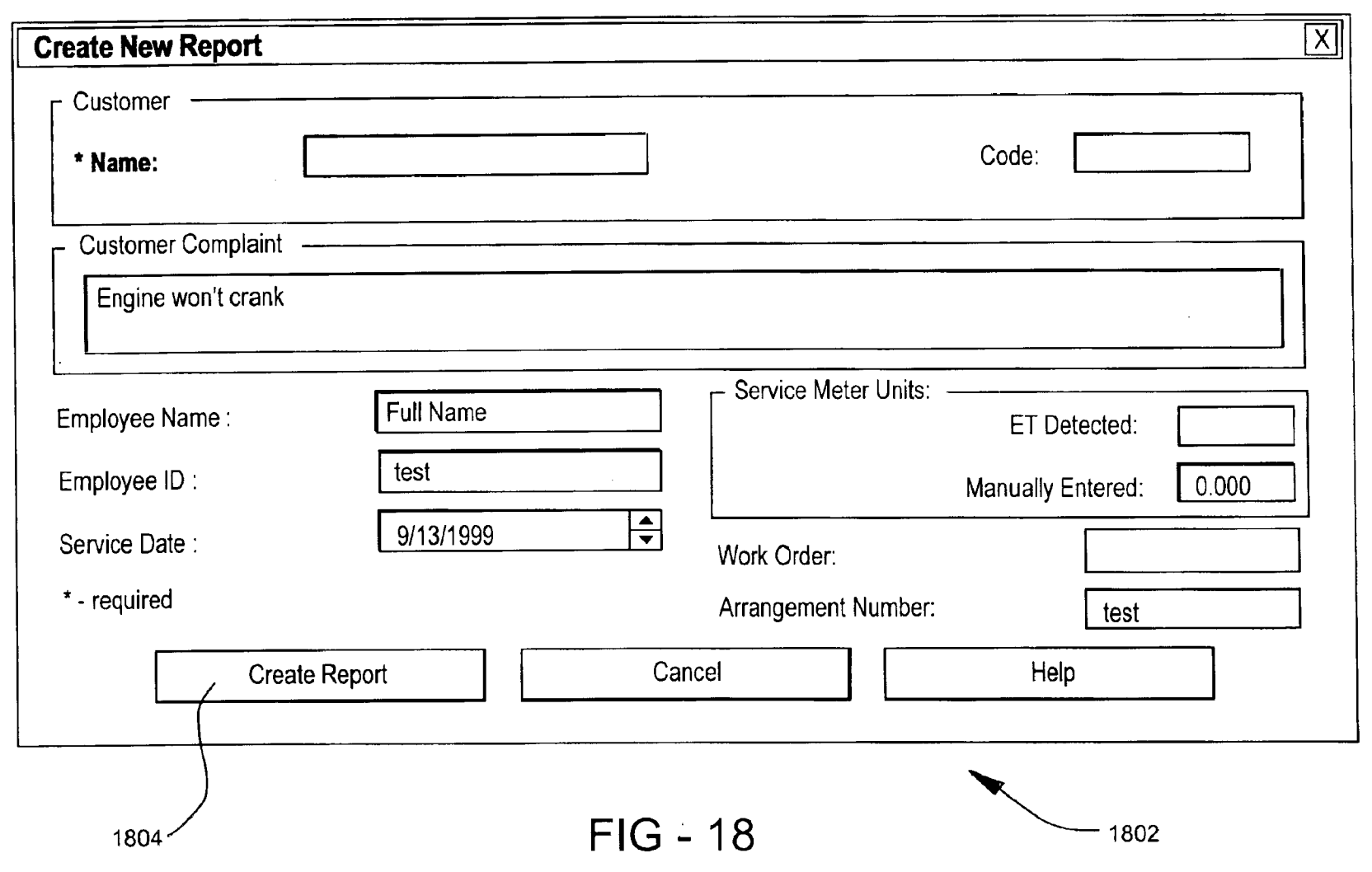

With reference to FIG. 18, new reports are created by first selecting a menu item (not shown) from the Menu Bar 304 which opens up a Create New Report Dialog 1802.

The user 118 fills out the information requested on the Create New Report Dialog 1802 and actuates a Create Report Button 1804.

With reference to FIG. 19, a Feedback Dialog 1902 is displayed upon actuation of the Feedback Button 402. The Feedback Dialog allows the user 118 to provided feedback concerning the Diagnostic Tool 114. The user 118 can offer corrections or suggestions for improving software functionality in the provided elements. The user's feedback may then be used in later releases of the Diagnostic Tool 114.

Figure 20:
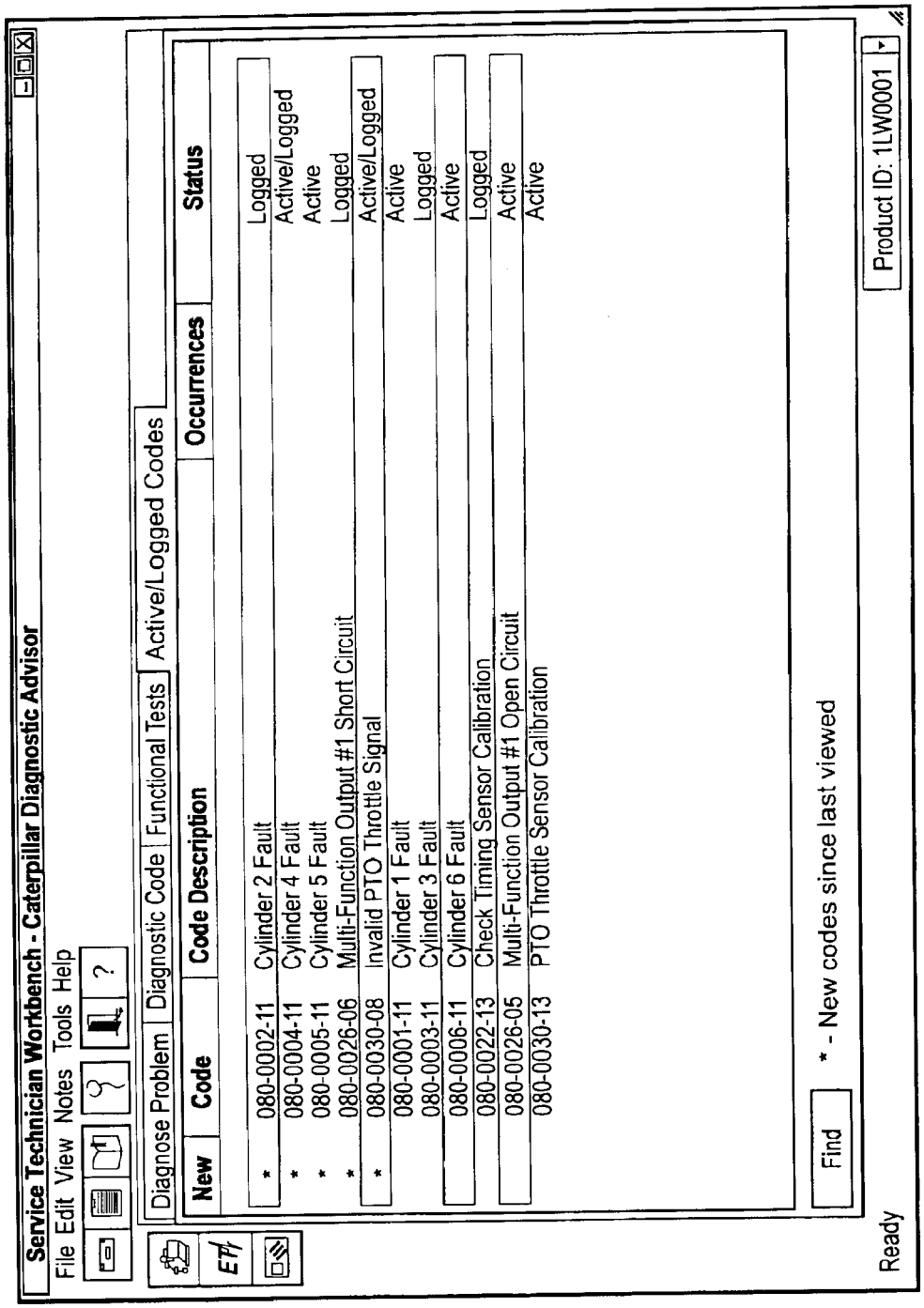
FIG. 20 is a diagrammatic illustration of an Active/Logged Codes Panel of the computer based system and method of FIGS. 1 and 2.

With reference to FIG. 20, the Tabbed Panel 308 also includes an Active/Logged Codes Tab 2002. Selection of the Active/Logged Codes Tab 2002 by the user 118, results in a Active/Logged Codes Panel 2004 being displayed. The Active/Logged Codes Panel 2004 is initially invoked when the user 118 selects a Read Codes Menu Item (not shown) from the Menu Bar 304 or actuates the Read Codes Button 408. The Active/Logged Codes Panel 2002 is updated whenever the Electronic Technician Module 106 returns diagnostic codes. All new codes have an asterisk at the front and are listed first.

Of course, various modifications of this invention would come within the scope of the invention.

Industrial Applicability

In use, the Diagnostic Tool Advisor 114 is utilized by a field technician or user 118. The Diagnostic Tool Advisor 114 is preferably implemented on a personal or laptop computer (not shown).

In the preferred embodiment, the Diagnostic Tool Advisor 114 is implemented as part of an Service Technician Workbench (STW) 116 which implements other related software as well as the Diagnostic Advisor Tool 114. Through the STW 116, the Diagnostic Advisor Tool 114 is coupled to the Electronic Technician Module 106. The Electronic Technician Module 106 is coupled to the work machine. Specifically, the Electronic Technician Module 106 is coupled to the machine to retrieve information from the work machine 106, e.g., sensor data and diagnostic codes.

The user 119 utilizes the Diagnostic Advisor Tool 114 to perform a diagnosis of the work machine by inputting the general or initial problem and then answering a series of questions presented by the Diagnostic Advisor Tool 114.

The Diagnostic Advisor Tool 114 also presents the user 118 with one or more diagnostic or functional tests to perform in order to assist in the diagnosis.

Other aspects, objects and advantages of this invention can be obtained from a study of the drawings, the disclosure and the appended claims.

What is claimed is:

1. A computer based method for providing case base diagnostics for a work machine, the case bases being comprised of diagnostic information and processes related to the work machine, including the steps of:

receiving from a user, a description of an initial problem related to the work machine;

displaying two or more questions as a function of the initial problem;

identifying inconsistent answers provided by the user to the two or more questions;

displaying a first set of recommended actions, as a function of the initial problem;

reading data values from the work machine in response to a user request;

receiving an answer from the user to the at least one question; and, displaying a second set of recommended actions as a function of the initial problem and the answer to the two or more questions, wherein the second set of recommended actions is one of a subset of the first set of recommended actions, a set of other recommended actions, and a combination of recommended actions from the first set and another set.

2. A computer based method, as set forth in claim 1, including the step of displaying the answer provided by the user.

3. A computer based method, as set forth in claim 1, including the step of displaying a confidence level associated with each recommended action in the first and second sets of recommended actions.

4. A computer based method, as set forth in claim 3, including the wherein the confidence level is displayed as a bar graph.

5. A computer based method, as set forth in claim 1, including the step of displaying a status associated with each recommended action in the first and second sets of recommended actions.

6. A computer based method, as set forth in claim 5, wherein the status associated with each recommended action has a value one of performed or not performed.

7. A computer based method, as set forth in claim 1, including the step of providing a link to information related to the work machine in an external source.

8. A computer based method, as set forth in claim 7, including the step of displaying the information in response to actuation of the link.

9. A computer based method, as set forth in claim 1, including the step of displaying an alert link corresponding to the at least one question.

10. A computer based method, as set forth in claim 9, including the step of displaying an alert dialog in response to actuation by the user of the alert link.

11. A computer based method, as set forth in claim 1, including the step of displaying an alert link corresponding to at least one recommended action from one of the first and second sets of recommended actions.

12. A computer based method, as set forth in claim 11, including the step of displaying an alert dialog in response to actuation by the user of the alert link.

13. A computer based method, as set forth in claim 1, including the step of displaying a question detail window containing detailed information regarding the at least one question, in response to user selection of the at least one question.

14. A computer based method, as set forth in claim 1, including the step of displaying an action detail window containing detailed information regarding a selected action from one of the first and second sets of recommended actions.

15. A computer based method for providing case base diagnostics for a work machine, the case bases being comprised of diagnostic information and processes related to the work machine, including the steps of:

receiving from a user, a description of an initial problem related to the work machine;

displaying at least one question, as a function of the initial problem;

displaying a first set of recommended actions, as a function of the initial problem;

receiving an answer from the user to the at least one question;

reading data values from the work machine in response to a user request;

displaying a second set of recommended actions as a function of the initial problem, the read data values, and the answer to the at least one question, wherein the second set of recommended actions is one of a subset of the first set of recommended actions, a set of other recommended actions, and a combination of recommended actions from the first set and an other set;

displaying an action detail window containing detailed information regarding a selected action from one of the first and second sets of recommended actions; and providing a graphical user interface for operation by the user.

16. A computer based method, as set forth in claim 15, including the step of providing a diagnostic advisor window.

17. A computer based method, as set forth in claim 16, including the step of providing a tabbed window pane having a plurality of tabs, wherein selection of one of the tabs results in a respective one of a plurality of panels being displayed in the tabbed panel.

18. A computer based method, as set forth in claim 17, wherein each of the plurality of tabs corresponds to a diagnostic panel, a diagnostic code panel, and a functional tests panel, respectively.

19. A computer based system for providing case base diagnostics for a work machine, the case bases being comprised of diagnostic information and processes related to the work machine, comprising:

an external source containing service information related to the work machine;

a diagnostic advisor tool for interaction with a user, receiving information from the user and responsively displaying at least one recommended action, and providing a link to relevant information within the external source; and wherein the diagnostic advisor tool is adapted to receive, from the user, a description of an initial problem related to the work machine, display two or more questions as a function of the initial problem, identify inconsistent answers provided by the user to the two or more questions, display a first set of recommended actions, as a function of the initial problem, read data values from the work machine in response to a user request, receive an answer from the user to the at least one question and display a second set of recommended actions as a function of the initial problem and the answer to the at least one question, wherein the second set of recommended actions is one of a subset of the first set of recommended actions, a set of other recommended actions, and a combination of recommended actions from the first set and an other set.

20. A computer based system, as set forth in claim 19, wherein the diagnostic advisor tool is adapted to display the answer provided by the user.

21. A computer based system, as set forth in claim 19, wherein the diagnostic advisor tool is adapted to display a confidence level associated with each recommended action in the first and second sets of recommended actions.

22. A computer based system, as set forth in claim 21, wherein the confidence level is displayed as a bar graph.

23. A computer based system, as set forth in claim 19, wherein the diagnostic advisor tool is adapted to display a status associated with each recommended action in t e first and second sets of recommended actions.

24. A computer based system, as set forth in claim 23, wherein the status associated with each recommended action has a value of one of performed or not performed.

25. A computer based system, as set forth in claim 19, wherein the diagnostic advisor tool is adapted to provide a link to information related to the work machine in an external source.

26. A computer based system, as set forth in claim 25, wherein the diagnostic advisor tool is adapted to display the information in response to actuation of the link.

27. A computer based system, as set forth in claim 19, wherein the diagnostic advisor tool is adapted to read data values from the work machine.

28. A computer based system, as set forth in claim 19, including the step of displaying an alert link corresponding to the at least one question.

29. A computer based system, as set forth in claim 28, wherein the diagnostic advisor tool is adapted to display an alert dialog in response to actuation by the user of the alert link.

30. A computer based system, as set forth in claim 19, wherein the diagnostic advisor tool is adapted to display an alert link corresponding to at least one recommended action from one of the first and second sets of recommended actions.

31. A computer based system, as set forth in claim 30, wherein the diagnostic advisor tool is adapted to display an alert dialog in response to actuation by the user of the alert link.

32. A computer based system, as set forth in claim 19, wherein the diagnostic advisor tool is adapted to display a question detail window containing detailed information regarding the at least one question, in response to user selection of the at least one question.

33. A computer based system, as set forth in claim 19, wherein the diagnostic advisor tool is adapted to display an action detail window containing detailed information regarding a selected action from one of the first and second sets of recommended actions.

34. A computer based system for providing case base diagnostics for a work machine, the case bases being comprised of diagnostic information and processes related to the work machine, comprising:

an external source containing service information related to the work machine;

a diagnostic advisor tool for interaction with a user, receiving information from the user and responsively displaying at least one recommended action, and providing a link to relevant information within the external source;

a graphical user interface for operation by the user; and wherein the diagnostic advisor tool is adapted to read data values from the work machine in response to a user request and display an action detail window containing detailed information regarding at least one of said recommended actions.

35. A computer based system, as set forth in claim 34, wherein the graphical user interface includes a diagnostic advisor window.

36. A computer based system, as set forth in claim 34, wherein the graphical user interface includes a tabbed panel having a plurality of tabs, wherein selection of one of the tabs results in a respective one of a plurality of panels being displayed in the tabbed panel.

37. A computer based system, as set forth in claim 36, wherein each of the plurality of tabs corresponds to a diagnose problem panel, a diagnostic code panel, and a functional tests panel, respective.

38. A computer program product for providing case base diagnostics for a work machine, the case bases being comprised of diagnostic information and processes related to the work machine, the computer program product comprising a computer usable storage medium having computer readable program code means embodied in the medium, the computer readable program code comprising:

computer readable program code means for receiving from a user, a description of an initial problem related to the work machine;

computer readable program code means for displaying two or more questions, as a function of the initial problem;

computer readable program code means for displaying a first set of recommended actions as a function of the initial problem;

computer readable program code means for reading data values from the work machine in response to a user request;

computer readable program code means for receiving an answer from the user to the two or more questions, and identifying inconsistent answers provided to the questions; and, computer readable program code means for displaying a second set of recommended actions as a function of the initial problem and the answer to the at least one question, wherein the second set of recommended actions is one of a subset of the first set of recommended actions, a set of other recommended actions, and a combination of recommended actions from the first set and an other set.

* * * * *

UNITED STATES PATENT AND TRADEMARK OFFICE
CERTIFICATE OF CORRECTION

PATENT NO. : 6,882,961 B2
DATED : April 19, 2005
INVENTOR(S) : Tara L. Cobble et al.

It is certified that error appears in the above-identified patent and that said Letters Patent is hereby corrected as shown below:

Title page,
Item [54], Title, delete "MACHINES" and insert -- MACHINE --
Item [57], ABSTRACT,
Line 13, after "is" insert -- one of --
Line 14, delete "actions." and insert -- actions, a set of other recommended actions, and a combination of recommended actions from the first set and an other set. --

Column 10,
Line 60, after "in" delete "t e" and insert -- the --

Signed and Sealed this

Twelfth Day of July, 2005

JON W. DUDAS
*Director of the United States Patent and Trademark Office*